United States Patent
Yates et al.

[11] Patent Number: 5,904,909
[45] Date of Patent: May 18, 1999

[54] METHODS FOR REMOVING AND DECOMPOSING METHYL BROMIDE FROM FUMIGATION

[75] Inventors: Scott R. Yates; Jianying Gan, both of Riverside, Calif.

[73] Assignees: The United States of America as represented by the Secretary of Agriculture, Washington, D.C.; The Regents of the University of California, Oakland, Calif.

[21] Appl. No.: 08/916,987

[22] Filed: Aug. 21, 1997

[51] Int. Cl.$^6$ .............................. B01D 53/02; A61L 9/00; A62B 7/08; C01B 7/00

[52] U.S. Cl. .................. 423/240 R; 95/131; 95/142; 422/30; 422/31; 422/32; 422/122; 423/240 R; 423/240 S; 588/206

[58] Field of Search ..................... 423/240 R, 240 S; 588/206; 95/131, 142; 422/31, 32, 33, 122

[56] References Cited

U.S. PATENT DOCUMENTS

| | | | |
|---|---|---|---|
| 4,018,704 | 4/1977 | Kuragano et al. | 252/411 R |
| 4,045,539 | 8/1977 | Hirano et al. | 423/240 |
| 4,058,457 | 11/1977 | Manes | 210/32 |
| 4,748,013 | 5/1988 | Saito et al. | 423/241 |
| 5,064,526 | 11/1991 | Rogers et al. | 208/262.5 |
| 5,125,935 | 6/1992 | Nakaya et al. | 55/26 |
| 5,505,908 | 4/1996 | Nagji | 422/31 |
| 5,556,595 | 9/1996 | Suzuki et al. | 422/32 |
| 5,656,673 | 8/1997 | Wilhelm et al. | 514/40 |

FOREIGN PATENT DOCUMENTS

| | | |
|---|---|---|
| 835493 A | 3/1976 | Belgium . |
| 73-1297 B | 1/1973 | Japan . |
| 49-061329 A | 6/1974 | Japan . |
| 74-022683 B | 6/1974 | Japan . |
| 52-4470 A | 1/1977 | Japan . |
| 55-064827 A | 5/1980 | Japan . |
| 80-50458 B | 12/1980 | Japan . |

OTHER PUBLICATIONS

Jianying Gan et al., *Journal of Agricultural and Food Chemistry* 43:1361–1367 (1995).

*Primary Examiner*—Gary P. Straub
*Assistant Examiner*—Cam N. Nguyen
*Attorney, Agent, or Firm*—M. Howard Silverstein; John D. Fado; Margaret A. Connor

[57] ABSTRACT

A method for the removal and rapid decomposition of halogenated fumigation agents is described. A fumigation agent, such as methyl bromide, contained in the gas stream exiting a fumigation chamber or structure is captured on activated carbon or other retentive substrate and rapidly decomposed using thiosulfate and water. The method provides an inexpensive, safe, and on-site executable way to remove and detoxify methyl bromide from fumigation discharge gases, thereby reducing or eliminating methyl bromide emissions into the atmosphere.

16 Claims, 3 Drawing Sheets

METHODS FOR REMOVING AND DECOMPOSING METHYL BROMIDE FROM FUMIGATION

BACKGROUND OF THE INVENTION

1. Field of the Invention

The present invention relates to methods for removing and decomposing halogenated hydrocarbon fumigation agents such as methyl bromide. More particularly, the invention provides methods using a substrate such as activated carbon to capture methyl bromide from fumigation gas streams and using thiosulfate to detoxify methyl bromide and thereby reduce or eliminate methyl bromide emissions into the atmosphere during commodity and structure fumigation.

2. Description of the Art

Methyl bromide (bromomethane, $CH_3Br$, CAS No. 74-83-9) is an important fumigant for treating agricultural commodities and structures. It is the most widely used fumigant for pest control in perishable produces such as, fresh fruits and vegetables, and cut flowers, endurable produces such as, cereal grains, dry fruits and nuts, and timber, and structures such as, mills, aircraft, and ships. Fumigation with methyl bromide is mandatory for import and export of many agricultural products in international trade. The worldwide use of methyl bromide for fumigating commodities and structures reached $1.8 \times 10^7$ kg in 1992. It is estimated that 80–95% of the applied methyl bromide is emitted into the air as a result of intentional discharge of methyl bromide waste gases at the end of fumigation and leakage during fumigation.

Although methyl bromide is an effective fumigant, there is serious concern about its use because (1) in the air, it is acutely toxic, and (2) emission of methyl bromide during commodity and soil fumigation are reportedly contributing to stratospheric ozone depletion. The use of methyl bromide has thus been proposed to be discontinued in the United States by 2001, and in the other countries at 2010. However, as there are no effective alternatives, retaining methyl bromide for postharvest and structural fumigation is of great economic importance. Extension of methyl bromide usage may be permitted only if its emissions are sufficiently reduced. As commodity or structural fumigations are always carried out in closed environments, recovering unreacted methyl bromide is feasible. The fumigated products absorb little methyl bromide, leaving most of the applied chemical available for recovery.

Methods have been devised to recycle and recover methyl bromide, for example, by adsorption of methyl bromide on a molecular sieve and then desorption with hot gas (see U.S. Pat. No. 5,505,908).

Various methods have been proposed to recover and decompose methyl bromide from waste fumigation gases. These include passing the waste gas over metal catalysts, such as the oxides of iron, manganese, cobalt, and copper, at high temperatures (100–400° C.), and further reacting with sodium or calcium hydroxide to neutralize the produced hydrogen bromide (Japanese Patent No.73,01,297; Japanese Patent No. 77,04,470); bubbling the waste gas through ethanolamine in the presence of sodium or calcium hydroxide, and further separating the reaction products through solvent extraction and ion-exchangers (Japanese Patent No. 74,127,862); and incinerating the waste gas at high temperature (600–1000° C.), and then treating with sodium hydroxide solution to neutralize the produce hydrogen bromide (Japanese Patent No. 74,61,329; Japanese Patent No. 75,159,462; French Patent No. 231,309). Although these methods have proved successful at experimental scales, they have one or more of the following disadvantages: (1) use of high temperatures, which requires a good containment to prevent methyl bromide from leaking; (2) multiple procedures which require the construction of complex systems and lead to high costs; (3) unsafe or toxic end products such as hydrogen bromide or ethanolamine-hydrogen bromide salt and ethanolamine quaternary ammonium bromide; (4) reactive chemicals such as strong bases; and (5) stringent reaction conditions. These deficiencies have prevented the implementation of any one of these methods on any practical scale.

Various methods have been proposed to remove methyl bromide using activated carbon. U.S. Pat. No. 4,018,704 describes desorption of methyl bromide contained on active carbon using vapor (60–130° C.) of an organic solvent that is inert to methyl bromide. Other methods include drawing methyl bromide waste gases from a fumigation room through an adsorption bed of activated carbon, and discharging the 'filtered' air directly into the atmosphere. After methyl bromide is adsorbed on carbon, heated, moist nitrogen gas (130–250° C.) (Japanese Patent No. 74,22,683), or hot methanol vapor (80° C.) (German Patent No. 2,550,504), or hot air (280° C.) (Japanese Patent No. 80,64,827 is used to desorb the methyl bromide. The desorbed methyl bromide is further incinerated at high temperatures (600° C.) in a special furnace, and the hydrogen bromide produced from combustion is finally scrubbed in sodium hydroxide solution to neutralize it. Although some of these methods are successful on experimental and small production scales, none of them has found wide application. The lack of application may be attributed to the following disadvantages: (1) the need to precisely control the time and flow rate in order to eliminate any significant breakthrough of methyl bromide through the adsorption bed; (2) the need for multiple steps and stringent conditions to detoxify methyl bromide-loaded carbon, which gives the necessity for constructing complex detoxification facilities to fulfill these steps and performing the detoxification process off site separately from the removal process; (3) the difficulties and cost involved in transporting the toxic carbon with permissions from environmental regulating agencies to a location where a detoxification facility is available; and (4) high time consumption and cost to accomplish detoxification of methyl bromide and to regenerate the activated carbon.

What is needed is an inexpensive, safe, and on-site executable method to remove and detoxify methyl bromide from fumigation discharge gases.

SUMMARY OF THE INVENTION

The present invention provides effective methods for removing and decomposing halogenated hydrocarbon fumigation agents such as methyl bromide. In the method of the invention a gas stream which contains a halogenated hydrocarbon fumigation agent such as methyl bromide, is contacted with a substrate, for example, activated carbon, which is capable of adsorbing or retaining the fumigation agent. The contacting is carried out for a time and under conditions wherein the halogenated hydrocarbon is adsorbed or retained on the substrate.

Next, the fumigation agent adsorbed or retained on the substrate is contacted with thiosulfate and water to decompose the fumigation agent into decomposition products. In one embodiment, the contacting with thiosulfate and water is carried out simultaneously. Alternatively, the contacting may be carried out sequentially.

The method of the invention may also have the additional step of reclaiming the substrate by washing it to remove the decomposition products and then drying it to reactivate it.

By use of the method of the invention, fumigation agents such as methyl bromide are captured from fumigation gas streams and detoxified using thiosulfate, thereby reducing or eliminating methyl bromide emissions into the atmosphere. Our method exploits the high adsorption capacity of halogenated hydrocarbon fumigation agents on carbon, and the rapid decomposition power of thiosulfate for halogenated hydrocarbon fumigation agents captured by carbon. Compared to existing methods for capture and destruction of methyl bromide, our method is more environmentally-compatible and lower in cost, and is especially suitable for on-site application.

In accordance with this discovery, it is an object of the invention to provide methods for removing and decomposing fumigation agents such as methyl bromide from fumigation discharge gases to thereby reduce or eliminate methyl bromide emissions from entering the atmosphere during commodity, structure, and soil fumigation.

Another object of the invention is the provision of effective methods to remove and detoxify fumigation agents such as methyl bromide from fumigation discharge gases which is inexpensive, safe, and executable on-site so that long distant transportation to an off-site facility is not required.

A further object of the invention is to provide for rapid degradation of halogenated hydrocarbon fumigation gases as is necessary for commercial applications.

A still further object comprises methods that meet current environmental regulations.

Other objects and advantages of the invention will become readily apparent from the ensuing description.

DETAILED DESCRIPTION OF THE INVENTION

The present invention provides methods to both capture and detoxify halogenated hydrocarbon fumigation agents, such as methyl bromide. Surprisingly, we have found that by use of our method, rapid degradation of methyl bromide (within 24 hours) can be carried out. This is extremely important for commercial applications where large volumes of fumigation air streams are used to fumigate commodities and structures.

In our method, a gas stream which contains a halogenated hydrocarbon fumigation agent, is contacted with a substrate which can capture (adsorb and/or retain) the fumigation agent. The contacting is carried out for a time and under conditions wherein at least a portion of the fumigation agent is adsorbed or retained. The contacting is continued until the fumigation agent is reduced to the desired level. This can be conveniently carried out by a single pass over a substrate with sufficient mass to adsorb or retain the fumigation agent or by recirculating the gas stream in contact with the substrate until the fumigation agent in the fumigation chamber is reduced to the desired level. Next, the adsorbed or retained fumigation agent is contacted with thiosulfate and water for a sufficient time and in a sufficient amount effective to decompose the fumigation agent. The decomposition products can be readily removed by washing the substrate, and the substrate may be dried to regenerate it for subsequent reuse.

Figure 1:
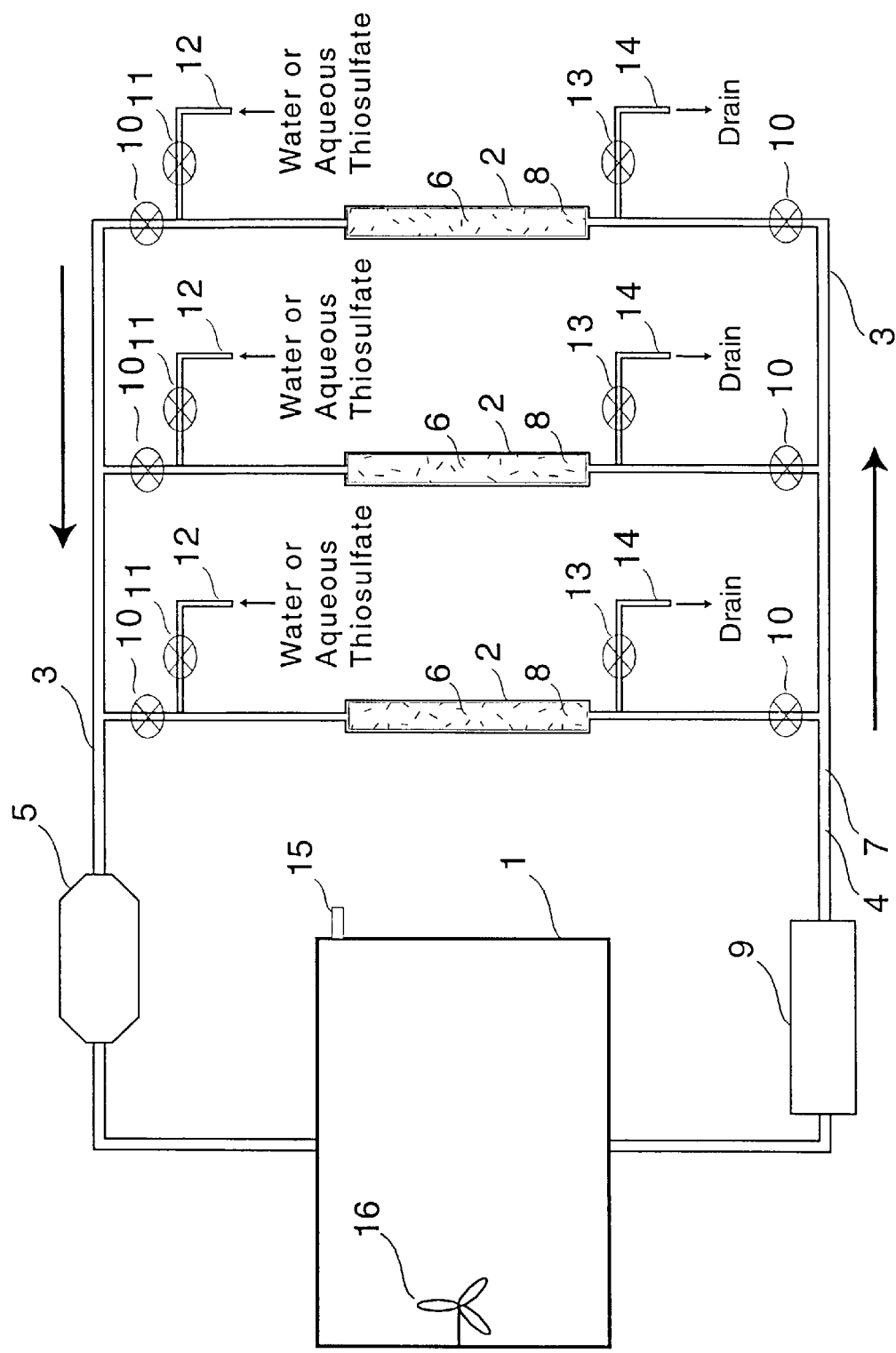
FIG. 1 is a diagram which illustrates the invention wherein multiple containers which contain the substrate to adsorb or retain the fumigation agent are placed in parallel.

Referring to FIG. 1, fumigation chamber 1 is connected to substrate container(s) 2 by means of gas stream conduit 3. The gas stream (4) which contains a halogenated hydrocarbon fumigation agent (7), for example, methyl bromide, is circulated through conduit 3 by circulating means 5, for example, a recirculating pump or vacuum system, to container 2 which contains substrate 6 which is capable of adsorbing or retaining the fumigation agent 7 in the gas stream. Container(s) 2 can optionally contain thiosulfate 8. The gas stream exiting the container is then optionally circulated back into the fumigation chamber until the desired amount of fumigation agent in the gas stream is adsorbed or retained on substrate 6. For handling moist fumigation effluent gas, a means (9) for drying the gas stream, for example, a dehumidifier or filter containing drying agents, is placed in front of substrate 6 to remove water. At the end of circulation, valve(s) 10 are closed to isolate container(s) 2 from the gas stream circulation. Next, valve(s) 11 is opened and in the case where thiosulfate is present in container(s) 2, water is added to the container(s) through inlet conduit(s) 12 sufficient to wet the substrate, desorb or release the fumigation agent, and dissolve sufficient thiosulfate to decompose the fumigation agent. The water is maintained in container(s) 2 until the fumigation agent is decomposed. Then outlet valve(s) 13 is opened and the water in container (s) 2 which contains decomposition products and unreacted thiosulfate is drained through water outlet conduit(s) 14.

In an alternate embodiment wherein thiosulfate is not present in container(s) 2, the contacting with thiosulfate and water is carried out simultaneously by adding an aqueous solution of thiosulfate (in place of water) to the containers(s) through inlet conduit(s) 12 in an amount to wet the substrate, desorb or release the fumigation agent, and decompose the fumigation agent. The aqueous solution of thiosulfate is maintained in contact with the fumigation agent in the container until the agent is decomposed. Then, outlet valve(s) 13 are opened and the aqueous solution which contains the decomposition products and unreacted thiosulfate is drained through outlet conduit(s) 14.

Optionally, sampling port 15 may be included for sampling the gas in chamber 1. A fan (16) for circulating the gaseous atmosphere in chamber 1 may also be optionally included.

To reclaim the used substrate 6, it is washed with sufficient water to remove the water-soluble decomposition products, and then it is dried to regenerate it. For example, washed carbon can be reactivated by drying it in a conventional oven at 100–120° C. overnight. As shown in FIG. 1 container(s) 2 may be placed in parallel so that a container can be removed from the system to regenerate the substrate contained therein without interruption of circulation of the gas stream to substrate contained in a second or third container. The number of containers used is determined by the amount of substrate needed to reduce the fumigation agent to the desired amount.

The substrate for use in the method of the invention is any one which captures (adsorbs and/or retains) the halogenated hydrocarbon fumigation agent. For cost effectiveness, it is preferred that the substrate is one that can be readily regenerated. A preferred substrate is activated carbon because it is readily available, relatively inexpensive, has a high adsorption capacity for methyl bromide at ambient temperature, and can be readily reactivated. Other substrates include zeolite and silicalite.

The method of the invention is suitable for removing and decomposing halogenated hydrocarbon fumigation agents. For purposes of this invention, halogenated hydrocarbon fumigation agents are defined as any halogenated hydrocarbon that is decomposed by thiosulfate, for example, methyl bromide, 1,3-dichloropropene, and chloropicrin.

For convenience, the substrate such as activated carbon, is packed in a bed or column, and the fumigation gas stream effluent from a fumigation chamber is passed through the substrate-containing bed or column for a time and under conditions effective to reduce the fumigation agent in the gas stream to the desired level. This can be readily determined by measuring the concentration of fumigation agent remaining in the fumigation chamber, for example, by sampling the gas in the chamber by means of sampling port 15, or can be estimated based on volume of the fumigation chamber and flow rate of the gas stream.

The amount of substrate used to adsorb or retain methyl bromide is that sufficient to reduce methyl bromide in the gas stream or in the fumigation chamber to the desired level. This can readily be determined by routine experimentation. Activated carbon can adsorb methyl bromide up to about 10–30% of the weight of carbon. To ensure adequate trapping of methyl bromide on activated carbon, it is suggested that the activated carbon be at least 3 times the mass of methyl bromide to be removed from the gas stream. In commercial applications, it may be desirable to use at least 10 times the mass of methyl bromide to be removed from the gas stream.

Once the desired adsorption or retention of fumigation agent has been achieved, the adsorbed or retained fumigation agent is contacted with thiosulfate and water in a sufficient amount and for a time effective to decompose the fumigation agent into decomposition products. As discussed above, in one embodiment the contacting with thiosulfate and water are carried out sequentially. For example, as described in the Example, below, thiosulfate is provided in the substrate bed or column, then when adsorption or retention of the fumigation agent on the substrate is complete, the bed or column is isolated from the system, and water is added in an amount effective to wet the substrate sufficient to desorb or release the fumigation agent and dissolve sufficient thiosulfate to decompose the fumigation agent. The reaction of the thiosulfate and fumigation agent is carried out until decomposition of the agent is decomposed to the desired level. The decomposition products and unreacted thiosulfate are readily removed by washing the substrate.

In an alternate embodiment, contacting with thiosulfate and water are carried out simultaneously as follows: the substrate having adsorbed or retained fumigation agent is contacted with aqueous thiosulfate in an amount and for a time effective to degrade the fumigation agent.

The amount of thiosulfate required is that sufficient to decompose all of the adsorbed or retained fumigation agent. This can readily be determined by routine experimentation or calculation. For example, to decompose a mole of methyl bromide (i.e., 0.095 kg), at least a mole of thiosulfate is required. The precise amount of thiosulfate will depend on the form. To ensure complete and rapid removal of the fumigation agent, it is desirable to have thiosulfate in excess of the fumigation agent by about 25–100% (i.e., 1.25 to 2.0 moles). Thiosulfate compounds suitable for the method of the invention include, for example, sodium thiosulfate, potassium thiosulfate, calcium thiosulfate, and ammonium thiosulfate.

The exact amount of water is not critical, as long as it is sufficient to soak the carbon. Subsequent to decomposition of the fumigation agent, the decomposition products and unreacted thiosulfate are freely soluble in water and can be readily disposed of.

The method of the invention may also include the step of reclaiming or reactivating the substrate by washing it to remove the decomposition products and drying it. For example, carbons recycled in this manner showed similar capacities in adsorbing methyl bromide as unused carbons.

A critical feature of the invention is the capture (adsorption and/or retention) of the halogenated hydrocarbon fumigation agent on a substrate, prior to the treatment of the fumigation agent with thiosulfate and water. This is critical to bring about the very rapid degradation of the fumigation agent, which is essential for commercial applications. As shown in FIG. 2, 80–90% of methyl bromide can be degraded within about 1 hour at room temperature. In contrast, if the methyl bromide is not captured on a substrate, for example, if methyl bromide gas is merely bubbled through an aqueous solution of thiosulfate, decomposition of methyl bromide is very slow and incomplete (about 20–30% decomposition after 2 hours). This is unacceptable for commercial applications which requires rapid decomposition of fumigation agent contained in large volumes of fumigation gas streams used to fumigate commodities and structures.

Surprisingly, we have found that retention of the methyl bromide on a substrate results in rapid degradation of the fumigation agent. In the presence of water, methyl bromide reacts quantitatively with thiosulfate:

$$CH_3Br + Na_2S_2O_3 \rightarrow NaCH_3S_2O_3 + Na^+ + Br^-$$

The above reaction is a well defined $S_N2$-type nucleophilic substitution reaction. However, we have discovered that degradation of methyl bromide captured on a substrate such as carbon goes through a rapid nucleophilic substitution reaction between methyl bromide ($CH_3Br$) and thiosulfate (e.g., $Na_2S_2O_3$), in which $S_2O_3^{-2}$ acts as a nucleophile and —Br on $CH_3Br$ as the leaving group. Application of this reaction for detoxifying methyl bromide, has never been reported.

The reaction rate of methyl bromide with thiosulfate, at $3.24 \times 10^{-2} M^{-1} s^-$, is >200 times that with sodium hydroxide. The reaction is second order in kinetics, and when an excessive molar amount of thiosulfate is present, the reaction is completed rapidly, e.g., 80–90% within about 1 hour at room temperature and 100% within 9–24 hours. The reaction products, Br— and sodium methylthiosulfate ($NaCH_3S_2O_3$), and unreacted $Na_2S_2O_3$, are freely soluble in water, non-corrosive, non-volatile, and low in toxicity. Solutions containing 1% of these products may be disposed of directly into the drain according to current environmental regulations.

The following example is intended only to further illustrate the invention and is not intended to limit the scope of the invention which is defined by the claims.

EXAMPLE

This example describes two small scale experiments using a model system to demonstrate the application of the method of the invention. Materials. Gaseous methyl bromide (99.5% purity, Aldrich Chemical Co., St. Louis, Mo.) was introduced into a Teflon® gas sampling bag. The methyl bromide in the sampling bag had a vapor density of 3.7 mg/mL at 20° C. Two types of activated carbon were used: Sigma® brand carbon (Sigma® Chemical Co., St. Louis, Mo.); a coconut-based carbon, catalog No. C2889; 8×20 mesh particle size; 600–800 $m^2$/g surface area, and 800 mg/g iodine number and a Calgon® PCB type carbon (Calgon® Carbon Corporation, Pittsburgh, Pa.), coconut based, 8×20 mesh particle size, 1150–1250 $m^2$/g surface area and 1200 mg/g iodine number. Both carbons were dried in an oven at 105° C. overnight before use. Sodium thiosulfate ($Na_2S_2O_3$, 99%) and sodium thiosulfate pentahydrate ($Na_2S_2O_3.5H_2O$, 99%) (both Fluka Chemical Co., Ronkonkoma, N.Y.) were used.

Experimental.

Degradation of carbon-adsorbed methyl bromide by sodium thiosulfate. The reaction kinetics of methyl bromide and sodium thiosulfate with methyl bromide adsorbed on carbon and sodium thiosulfate present in excessive molar amount, were measured in solution at room temperature (20° C.). Two grams of Sigma® or Calgon® carbon were weighed into 21-mL headspace vials, and the vials were crimp sealed with aluminum caps and Teflon®-faced butyl rubber septa. Twenty mL of gaseous methyl bromide were then injected through the septum into the vial using a gas-tight syringe. The amount of methyl bromide that each carbon sample adsorbed was determined by weighing the sample to 0.1 mg before and after the spiking. On average, each carbon sample received 71±5 mg (0.74±0.05 mmole) of methyl bromide.

After equilibrating the spiked carbon samples for 2 hours at room temperature, 5 mL of 0.2M sodium thiosulfate solution (1.0 mmole) was injected into the sample vials through the septum. All sample vials remained at room temperature to allow the reaction to proceed. The time of sodium thiosulfate addition was considered as time zero. Three replicate samples were removed at different times, and the carbon slurry was washed into a beaker with 20 mL deionized water. Bromide in the solution phase was then determined using a Br-selective electrode on an Accumet®-25 pH meter (Fisher Scientific, Pittsburgh, Pa.) after proper dilutions. The decomposition rate of methyl bromide was calculated as percent of the spiked amount that was degraded to $Br^-$.

The system included a fumigation enclosure (box) made of sheet-metal (60×60×30 cm, or 106 L inside volume), a recirculating pump (Fisher Scientific, Pittsburgh, Pa.), a moisture filter containing Drierite® (Fisher Scientific), and an adsorption bed. The adsorption bed was constructed by packing 325.0 g carbon (60%) and 216.0 g $Na_2S_2O_3.5H_2O$ (40%) into a hollow brass cylinder [8 (i.d.)×30 cm (h)] with an inlet and outlet. Glasswool was placed at both ends of the cylinder to hold carbon particles in place. The components were connected with latex tubing. During operation of the recirculating pump, a flow of about 14 L/min circulating from the fumigation box through the carbon bed and then back into the fumigation box was carried out.

Liquid methyl bromide (density=1.73 g/mL) prepared by chilling gaseous methyl bromide on dry ice was injected into the fumigation box through the injection/sampling port. In Experiment I, the adsorption bed was packed with the Sigma® brand carbon, and 50.0 g liquid methyl bromide was added. In Experiment II, the bed was packed with the Calgon® carbon, and 60.0 g liquid methyl bromide was introduced. After application, methyl bromide concentration in the box was periodically monitored by withdrawing an aliquot of air sample from the inside of the box and analyzing on a gas chromatograph (GC) (Hewlett Packard Company, Fresno, Calif., Model No. HP5890). The GC conditions were RTX-624 capillary column (30 m×0.32 mm×1.4 $\mu$m, Restek Co., Bellefonte, Pa.), 1.1 mL/min helium flow rate, 35° C. isothermal column temperature, 170° C. injection port temperature and 240° C. electron capture detector temperature. Recirculation was stopped when methyl bromide concentration in the fumigation box either decreased to a nondetectable level or became constant. The carbon cylinder was then dismantled, and the weight of carbon-$Na_2S_2O_3$ mix was measured to 0.1 g. Since the moisture filter placed in front of the adsorption bed removed any water in the air stream, net weight change could be attributed to the adsorption of methyl bromide onto the carbon.

To detoxify recovered methyl bromide, carbon-$Na_2S_2O_3$ mix was transferred into a 2-L Erlenmeyer flask, and 600 mL deionized water was added. The flask was then closed with aluminum tape, and kept at room temperature overnight. To determine the rate of methyl bromide degradation, the reacted carbon slurry was washed into a large pan with 10 L deionized water, and the mixture was thoroughly stirred. An aliquot of the solution was sampled and measured for bromide ion ($Br^-$) concentration after dilutions.

Regeneration of spent carbon. The carbon used in the above experiments was rinsed in running tap water for approximately 10 minutes and then dried at 105° C. overnight in a conventional oven. This process accomplished both disposal of reaction products and unreacted $Na_2S_2O_3$, and regeneration of the spent carbon. To compare the capacity of regenerated and unused carbons for adsorbing methyl bromide, an air stream containing 150 mg/L methyl bromide was passed through a moisture filter, and then a cylinder packed with 325 g of the regenerated or unused Sigma® brand or Calgon® brand carbon at 1 L/min. Methyl bromide in the effluent was periodically monitored, and methyl bromide flowing into the adsorption bed was stopped at the first detection of methyl bromide in the effluent. The weight of carbon was measured to 0.1 g, and increase in the weight of carbon was assumed to be due to adsorption of methyl bromide onto the carbon.

Results.

Reaction of Sodium thiosulfate with carbon-adsorbed methyl bromide.

Figure 2:
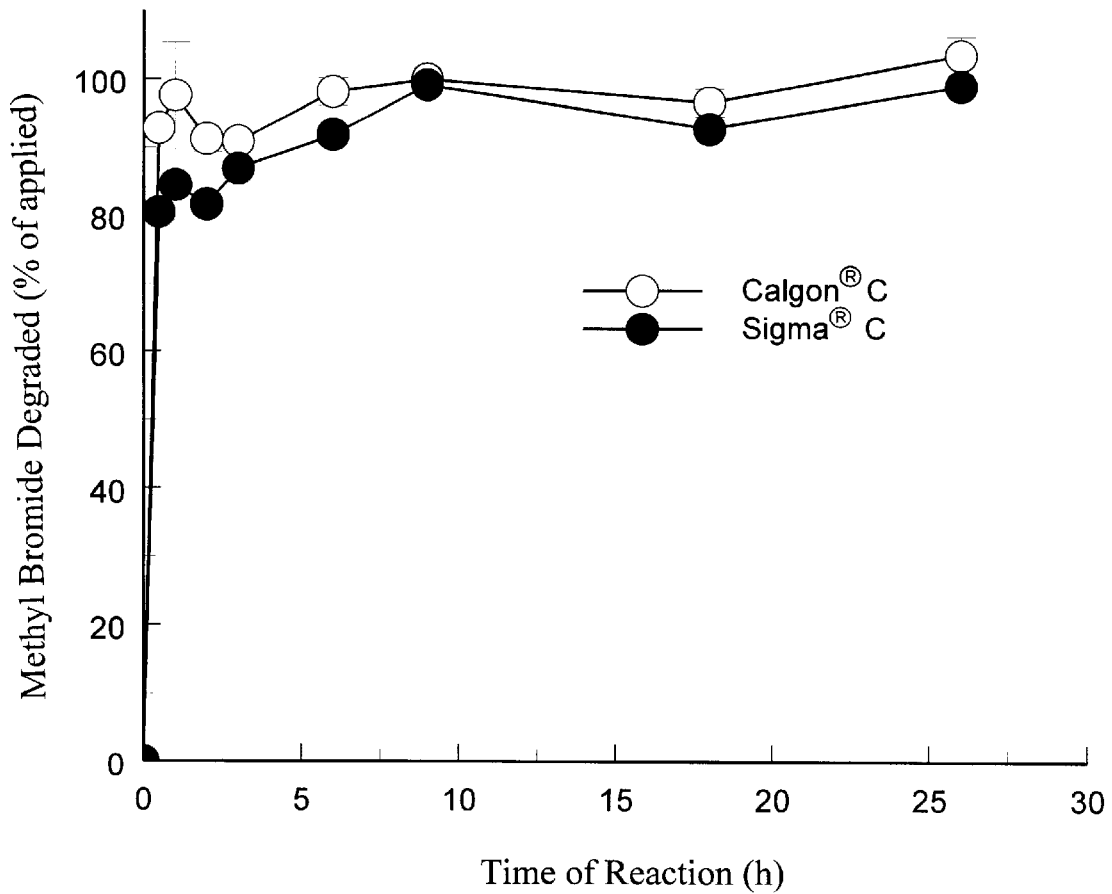
FIG. 2 shows the degradation of methyl bromide adsorbed on carbon by thiosulfate over time at room temperature (20° C.).

In water solution with the presence of an excessive molar amount of sodium thiosulfate, methyl bromide adsorbed on carbon was rapidly decomposed to $Br^-$ at room temperature (20° C.) (FIG. 2). Approximately 92 and 80% of the methyl bromide adsorbed on Sigma® and Calgon® C was degraded to $Br^-$ after 30 minutes of reaction. After 9 hours of reaction, decomposition of methyl bromide measured as production of $Br^-$ approached near 100% for both carbons, indicating that decomposition of methyl bromide was approximately completed.

Figure 3:
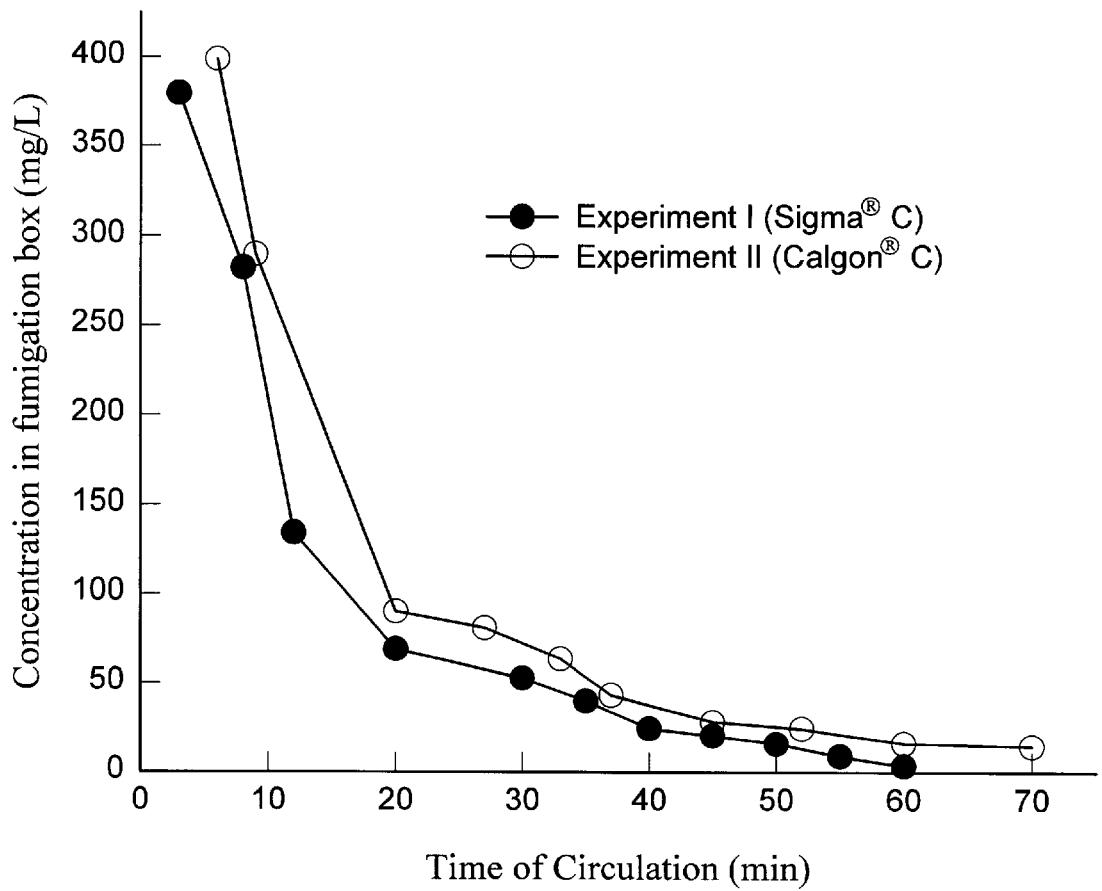
FIG. 3 shows the decrease in concentration (mg/L) of methyl bromide inside the fumigation box as a function of time of circulation (minutes) using two types of activated carbon.

Simulated pilot experiments. As the time of circulation increased, methyl bromide concentration in the fumigation box rapidly decreased (FIG. 3). The concentration decrease was especially fast at the beginning. For instance, about 78–82% of the added methyl bromide was removed within the first 20 minutes based on concentration differences. In Experiment I, methyl bromide in the fumigation box decreased to a nondetectable level after 60 minutes of circulation, while in Experiment II, it was depleted to less than 3% of the applied amount after 70 minutes of circulation. Weighing carbon at the end of circulation showed that 49.5 g, or 99% of the added 50.0 g methyl bromide was trapped in the Sigma® C adsorption bed in Experiment I, and 57.4 g, or 95.7% of the added 60.0 g methyl bromide was trapped in the Calgon® C adsorption bed in Experiment II (Table 1). The adsorption of methyl bromide was equivalent to 15.2 and 17.7% of the weight of carbon for the Sigma® and Calgon® C, respectively. Similar methyl bromide adsorption capacities have been reported for activated carbons by other investigators. In practice, since the amount of methyl bromide to be applied is always known beforehand, the amount of carbon that is needed to remove methyl bromide can be roughly determined.

After water was added into the carbon-sodium thiosulfate mix and the reaction continued overnight at room temperature, 101±3% of the adsorbed methyl bromide on the Sigma® C and 97.4±1.4% on the Calgon® C was decomposed to $Br^-$, respectively (Table 1). Based on $Br^-$ production, only about 60–72% of the $Na_2S_2O_3 \cdot 5H_2O$ was actually consumed by methyl bromide. Since 1 g of methyl bromide (MW=96) consumes approximately 2.6 g of $Na_2S_2O_3 \cdot 5H_2O$ (MW=248), in practice the use of $Na_2S_2O_3 \cdot 5H_2O$ 3–5 times the mass of methyl bromide would assure complete decomposition of methyl bromide. Since the decomposition is based on the reaction between methyl bromide and $S_2O_3^{-2}$, the amount of water is not critical, as long as it is sufficient to soak the carbon and dissolve sodium thiosulfate salt.

Regeneration of spent carbon. The used carbons were regenerated (reactivated) by rinsing with water and then drying at 105° C. overnight. The capacity of the regenerated carbons to adsorb methyl bromide was compared with the unused carbons. The regenerated Sigma® or Calgon® C adsorbed similar amounts of methyl bromide as the unused carbon under the same conditions, indicating that the water-rinsing and oven-drying did not affect the carbon's capacity to adsorb methyl bromide.

TABLE 1

Removal and decomposition of methyl bromide in simulated pilot experiments

|  | Experiment I (Sigma ® C) | Experiment II (Calgon ® C) |
|---|---|---|
| Amount of carbon (g): | 325 | 325 |
| Amount of $Na_2S_2O_3 \cdot 5H_2O$ (g): | 216 | 216 |
| Flow rate (L min$^{-1}$): | 14 | 14 |
| Total circulation time (min): | 60 | 70 |
| Amount of $CH_3Br$ added (g): | 50.0 | 60.0 |
| Amount of $CH_3Br$ removed (g): | 49.5 | 57.4 |
| % of $CH_3Br$ removed: | 99 | 97.5 |
| % of $CH_3Br$ decomposed: | 101 ± 3 | 97.4 ± 1.4 |

TABLE 2

Methyl bromide adsorption capacities of regenerated and unused carbons

|  | Sigma ® C | | Calgon ® C | |
|---|---|---|---|---|
| Carbon Type | Re-generated | Un-used | Re-generated | Un-used |
| Amount of carbon (g): | 325 | 325 | 325 | 325 |
| Influent $CH_3Br$ conc. (mg L$^{-1}$): | 150 | 150 | 150 | 150 |
| Flow rate (L min$^{-1}$): | 2 | 2 | 2 | 2 |
| Time to reach breakthrough (min): | 190 | 180 | 200 | 190 |
| Total $CH_3Br$ adsorbed on C (g): | 44.3 | 40.8 | 49.4 | 47.8 |
| $CH_3Br$/Carbon (%, wt./wt.): | 13.6 | 12.5 | 15.2 | 14.7 |

It is understood that the foregoing detailed description is given merely by way of illustration and that modification and variations may be made within, without departing from the spirit and scope of the invention.

What is claimed is:

1. A method for removing and decomposing a halogenated hydrocarbon fumigation agent in a halogenated hydrocarbon fumigation agent-containing gas stream, which comprises:

(a) contacting a gas stream containing a halogenated hydrocarbon fumigation agent selected from the group consisting of methyl bromide, 1,3-dichloropropene, and chloropicrin with an adsorbent which adsorbs or retains said fumigation agent to adsorb or retain said fumigation agent from said gas stream; and (b) decomposing said fumigation agent adsorbed or retained on said adsorbent by contacting said adsorbed or retained fumigation agent with thiosulfate and water to decompose said fumigation agent.

2. The method of claim 1 wherein in step (b) said absorbent is contacted with thiosulfate and water sequentially.

3. The method of claim 1 wherein in step (b) said adsorbent is contacted with thiosulfate and water simultaneously.

4. The method of claim 2 which further includes:

(c) reclaiming said adsorbent by washing said adsorbent to remove decomposition products and drying said absorbent.

5. The method of claim 1 wherein said substrate is selected from the group consisting of activated carbon, zeolite, and silicalite.

6. The method of claim 1 wherein said thiosulfate is selected from the group consisting of sodium thiosulfate, potassium thiosulfate, calcium thiosulfate, and ammonium thiosulfate.

7. The method of claim 1 wherein said adsorbent is activated carbon.

8. A method for removing and decomposing methyl bromide in a methyl bromide-containing gas stream, which comprises:

(a) contacting a gas stream containing methyl bromide with an adsorbent which adsorbs or retains methyl bromide to adsorb or retain methyl bromide from said gas stream; and (b) decomposing methyl bromide adsorbed or retained on said adsorbent by contacting said adsorbed or retained methyl bromide with thiosulfate and water.

9. A method for removing and decomposing a halogenated hydrocarbon fumigation agent in a halogenated hydrocarbon fumigation agent-containing gas stream from a fumigation chamber or structure, which comprises:

(a) circulating a gas stream containing a halogenated hydrocarbon fumigation agent selected from the group consisting of methyl bromide, 1,3-dichloropropene, and chloropicrin from a fumigation chamber or structure to an adsorbent to adsorb or retain said fumigation agent in said gas steam and returning the resultant gas stream to the fumigation chamber; and (b) decomposing said fumigation agent adsorbed or retained on said adsorbent by contacting said adsorbed or retained fumigation agent with thiosulfate and water to decompose said fumigation agent.

10. The method of claim 9 which further includes:

(c) reclaiming said adsorbent by washing said adsorbent to remove decomposition products and drying said adsorbent.

11. A method for removing and decomposing methyl bromide in a methyl bromide-containing gas stream from a fumigation chamber or structure, which comprises:
   (a) circulating a gas stream containing methyl bromide from a fumigation chamber or structure to an adsorbent to adsorb or retain methyl bromide in said gas steam and returning the resultant gas stream to the fumigation chamber; and
   (b) decomposing methyl bromide adsorbed or retained on said adsorbent by contacting said adsorbed or retained methyl bromide with thiosulfate and water.

12. The method of claim 2 wherein the thiosulfate was present during step (a).

13. The method of claim 3 which further includes:
   (c) reclaiming said adsorbent by washing said adsorbent to remove decomposition products and drying said adsorbent.

14. The method of claim 8 wherein said adsorbent is activated carbon.

15. The method of claim 9 wherein said adsorbent is activated carbon.

16. The method of claim 11 wherein said adsorbent is activated carbon.

* * * * *